Figure 1:
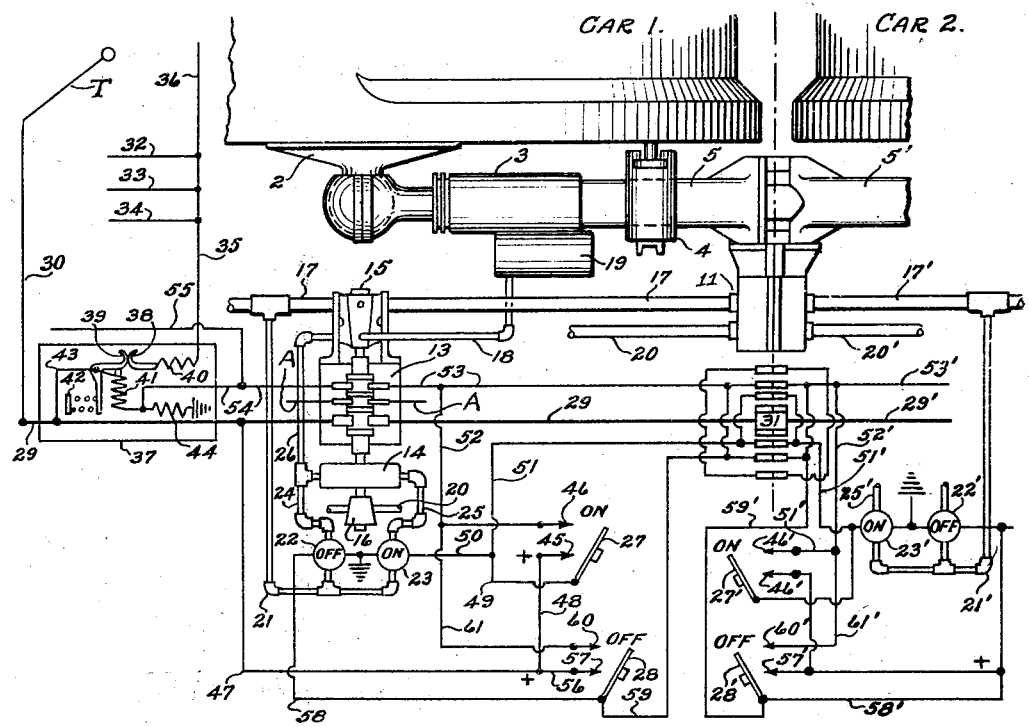

Dec. 16, 1930.  E. A. LARSSON  1,785,269
COUPLING MECHANISM
Filed Sept. 7, 1929

Witness:
H. J. Stromberger

Inventor
ERNST A. LARSSON
By
Attorney

Patented Dec. 16, 1930

1,785,269

UNITED STATES PATENT OFFICE

ERNST A. LARSSON, OF MANSFIELD, OHIO, ASSIGNOR TO THE OHIO BRASS COMPANY, OF MANSFIELD, OHIO, A CORPORATION OF NEW JERSEY

COUPLING MECHANISM

Application filed September 7, 1929. Serial No. 391,044.

My invention relates to the automatic control of car, air and electric coupling means on two coupled cars or cars about to be coupled or uncoupled.

The main object of my invention is to provide a coupling system wherein the car, air and electric coupling mechanism on two coupled cars may be controlled by an operator from a station in either one of the cars; also may be controlled on any uncoupled car from a station on that car and in which the electric circuit or circuits feeding current to the heat, light or power circuits or to the master controller for the motors and for other purposes may be controlled before two cars are coupled or uncoupled.

In coupling or uncoupling two cars equipped with train line circuits, multiple unit controls, etc., it is quite desirable to have the electric contacts connecting the circuit between two cars de-energized at the time the coupling is made or broken.

It is desirable also to have the control of the uncoupling and coupling of the cars take place on the coupled cars from a station in one of the cars, and to also control the de-energizing of the circuits upon the cars from this station.

In the drawing accompanying this specification:—

Fig. 1 is a schematic drawing of the adjacent ends of two cars indicated as car 1 and car 2 and the arrangement of the indicated parts shown on car 1 are duplicated on car 2.

Figure 2:
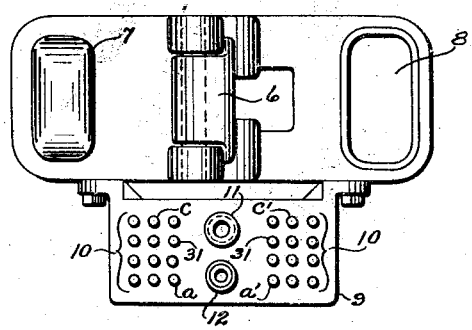

Fig. 2 is a face view of a car coupler having secured thereto coupling mechanism for the electric and air circuits.

The cars are each shown as provided with a platform 1 to the underside of which is secured a car coupling mechanism comprising an anchorage 2, a draft gear 3, a support 4 and coupler head 5. The coupler head is provided with a hook portion 6 and projections and recesses 7 and 8 respectively. Mounted upon the coupler head is a combined electric and air coupler 9 having a plurality of contacts 10 and a reservoir air line connector 11 and a brake line connector 12. The contacts 10 on opposite sides of the vertical center line are cross-connected as, for instance, $a$ is connected to $a'$ and $c$ is connected to $c'$, thereby permitting the proper connection of like train line circuits regardless of which end of the cars is connected.

My invention also provides for a contact switch 13 preferably of the drum type and operated by a pneumatic engine 14 and having connected to the shaft of the drum switch a double valve 15 and a single valve 16. The double valve is shown as controlling a reservoir line 17 connected to the air coupler 11 and also controlling a pipe 18 connected to a pneumatic uncoupling engine 19, and the ports in the valve 15 are arranged so that when the pipe 17 is open, the pipe 18 is closed, and the valve 16 controlling the brake pipe 20 is open when the pipe 17 is open, and the valves 15 and 16 are so arranged with respect to the switch 13 that when the switch 13 is closed, the valves open communication through both pipes 17 and 20 and vice versa.

The engine 14 operating the switch 13 and valves 15 and 16 is connected to the air or reservoir line 17 through the pipe 21 and electropneumatic valves 22 and 23 and the pipes 24 and 25. From the pipe 24, a pipe 26 leads to the valve 15 to supply air to the pipe 18 when and after the switch 13 has been opened and the valves in the pipes 17 and 20 closed. The valve 22 may be termed the off or disconnecting valve and the valve 23 the on or connecting valve, and these valves are controlled by the on and off switches 27 and 28 respectively.

The cars are supplied with electric current secured from a conductor through a current collector T. I show what is termed a bus line 29 which derives its current from the trolley T through the conductor 30, and a trolley T may be mounted on each car or only on one car of the train. Conductor 29 is controlled by the switch 13 and leads through contacts 31 on the face of the coupler. The current used for various purposes in the car is taken from the bus line 29. The switch 13 may be provided with contacts to take care of any number of train line circuits to be connected by the electric couplers from car to car, one such circuit being shown as 29 and another as A.

I have indicated lines 32, 33 and 34 each connected to a conductor 35, and the lines 32, 33 and 34 may be considered as supplying current to the lights, the heaters and compressors respectively, and the line 36 may connect to the master controller for the operation of the various switch groups controlling the supply of current to the motors on the cars.

It is not desirable to provide a switch 13 which in breaking the bus line circuit would be large enough to take care of all conditions, as, for instance, a train of four cars may derive the current for the bus line from the last car, but each car may be equipped with light, heat and compressor and the combined current may amount to 25 or 30 amperes per car. This would mean that between the contacts of the last two cars current would be flowing to the first three cars, which would amount to 75 or 90 amperes and at about 600 volts, although occasionally a higher voltage for current may be embodied.

It will be seen that if the switches 13 controlled all of this current, it would be necessary to make the switches 13 on all cars capable of not only carrying but breaking the maximum current used in a train and at 600 volts or more. However, if each car were equipped with its own trolley, then the current flowing from car to car would be expected to be relatively small and the switch 13 could be accordingly reduced, but conditions are not always standard; therefore the maximum must be provided for. In my arrangement I have provided means, namely the switch 37 which is positioned on each car to control the current to the conductor 35, therefore controlling the current in the conductors 32, 33, 34 and 36 such that the switch 37 is caused to open before the switch 13 opens and this takes place on each car, thus breaking the light, heat, compressor circuits, etc., on each car. I am therefore obliged to provide a switch 13 large enough to carry the maximum current in each circuit therethrough, but not so large as to break such circuit, as the break takes place in the switch 37 which is a less expensive switch than 13 and is provided with a blowout. The moving part 39 of switch 37 is light and mounted on a simple pivot while the switch 13 is connected to the valves 15 and 16 which have considerable friction while there is also friction in the contacts of switch 13 and also in the engine 14, and I therefore find that switch 37 is quicker in opening than switch 13.

The switch 37 is very inexpensive as compared with the switch 13. The switch 37 comprises a fixed contact 38, a pivoted contact 39 to engage the contact 38, a blow-out coil 40 to disrupt the arc when the switch is open, an operating and holding coil 41 for closing the contacts and holding them closed, and a spring 42 biased to operate the contacts 38 and 39.

It will be noted that the coil 41 is connected to the bus line through the conductor 43 and thence to ground through a resistance 44 which cuts the current flowing to a very small volume. Therefore, upon the bus 29 being energized, the coil 41 is instantly energized, thus closing the contacts 38 and 39 and charging the conductors 35, 36, 32, 33 and 34.

I prefer to have the coil 41 operate as a closing and holding coil which is energized whenever the bus 29 is energized because if the coil 41 should burn out, the contacts would be open through the biased action of the spring 42, but if the switch 37 was arranged to be normally closed, but opened by energizing the coil 41 when desired to uncouple, if then, under such circumstances, the coil 41 should become burnt out it would not open the contacts 38 and 39 when it would be expected to and the result, as later explained, would be the uncoupling of the cars and the opening of the switch 13 with current flowing therethrough.

The operation of my invention is as follows:—

Consider cars 1 and 2 as having been bumped together and coupled so far as the air and electric contacts and the car coupler 5 are concerned. The operator on either car, but, for example car 1, presses the on button 27, which would then connect the contacts 45 and 46 and current would flow from the bus 29 through the conductors 47 and 48, contacts 45 and 27, conductors 49 and 50, to the electropneumatic valve 23, thence to ground, thus completing a circuit. The pneumatic valve 23 would be opened, permitting air to flow from the reservoir line 17, through the pipe 21, penumatic valve 23, pipe 25 to engine 14, causing the same to operate, close the switch 13 and open the valves 15 and 16 with respect to the pipes 17 and 20, and simultaneously closing the valve 15 with respect to the pipe 18.

This same operation will take place on car 2 as current will flow from the conductor 49, through the conductor 51, contacts in the coupler head of the two cars, thence through conductor 51' of car 2 to the electropneumatic valve 23', which will open and air will flow through the pipe 25' to the electropneumatic engine on car 2 where the switch will be opened and the angle cocks thereon moved therewith as in car 1. Also, upon closing the switch 27, current will flow from the contact 45 through the switch 27 to contact 46, through conductors 51, 52 and 53, to the contacts in the coupler heads of cars 1 and 2.

Current cannot flow through the switch 13 until the switch is closed, which will follow quickly the closing of the switch 27, after which current will flow through the switch 13 and conductor 54 to the ground end of the coil 41. The closing of the switch 13, however, while the switch 27 is closed will place a short circuit about the coil 41, due to the fact that one end of it is connected to the bus line 29 and the other end is also connected to the bus line when the switch 27 is closed, through the conductor 54, switch 13, conductors 53 and 52, contacts 46, 27 and 45, conductors 48, 47, 29 and 43. This short circuiting of the coil 41 will cause the same to be de-energized and the switch 37 will open and remain open as long as the switch 27 in car 1 is closed.

I have just traced the flow of current through various conductors and contacts to open the switch 37 when switch 27 is closed and this current will also flow through conductor 53 to and through the coupler heads, and on car 2 the current will flow through the conductor 53' to the corresponding drum switch 13 on car 2, which will close as already explained and thence the current will flow to the switch 37' on car 2 and open the same as switch 37 on car 1. The switch 27 may now be released and the cars are connected up mechanically, electrically and pneumatically for operation.

Assuming the cars connected for proper operation and the operator desiring to cut off one of the cars from a station in either car, as, for instance, car 1, he would then press the off button or switch 28 and current would flow from line 29 through conductors 47 and 56, contacts 57 and 28 and conductor 58 to the off pneumatic valve 22, which will be opened and air will then flow from the reservoir line 17, through the pipe 21, valve 22, pipe 24 to the engine 14, which will move the switch 13 to its open position. The valves 15 and 16 will also be moved simultaneously with the switch so that the ports will close the pipes 17 and 20 but open a communication from pipe 26 to pipe 18, and air will then flow to the uncoupling engine 19, which will operate the car coupler lock to its uncoupled position. This uncoupling operation does not take place until after the switch has been opened and the valves in the lines 17 and 20 closed, therefore there can be no escape of air in the couplers 11 and 12, nor arcing at the contacts on the electric coupler 9 when the cars are parted.

In order to prevent excessive arcing on the switch 13 and the necessity of a large and expensive switch 13, I make use of the smaller, quick acting switch 37 to open the circuits, taking power from the bus line 29 prior to the opening of the switch 13.

When the switch 28 is closed, current will also flow from the contact 28, through the conductor 59, through the contacts in the electric coupler, the conductors 59' and 58' to the off electropneumatic valve 22', thereby permitting air to flow from the pipe 17'', through the pipe 21', valve 22', to the pneumatic engine operating the switch 13 on car 2. The operation of the engines on the two cars is substantially simultaneous.

Also, upon closing the switch 28 the conductors 54 and 29 which are connected to the ends of coil 41 will be connected together through conductor 47, contact 60, conductors 61, 52, 53, and switch 13, thus short circuiting and de-energizing the switch 37 and in like manner the corresponding conductors 53' and 29' will be connected on car 2 when the switch 28 on car 1 is closed thus opening the corresponding switch 37 on car 2. The operation of the two switches 37 on the two cars will be substantially instantaneous and will be prior to the opening of the drum switches 13 for the reasons already given.

The opening of the switch 37 removes practically all possibility of any arcing at the switch 13; there will be, of course, practically no current flowing through the contacts controlling the conductors 53 and 54 as these conductors form part of a short circuit path across the coil 41 and which has a small drop of potential and the current to ground through the conductor 54 is very small due to the resistance 44.

I again point out that since the coil 41 holds the switch 37 closed whenever there is current upon the line 29 and the switch is biased to be opened by the spring 42, that if the coil 41 should become damaged or burnt out, the switch 37 would automatically open and it would be impossible to take current from the bus 29 other than that required to operate switches 13 to their open or closed positions. Were the switch 37 arranged to be normally spring closed and opened by means of energizing the coil 41 and if the coil 41 should become damaged without being known to the operator and he attempted to disconnect two cars; then upon pressing the off button of switch 28, the switch 37 would not open and current flowing through the switch 13, which might be quite large, might damage or destroy the switch 13. I consider the construction and operation of the switch 37 as a very valuable safety feature.

It will be noted that a conductor 55 leads from the line 54 and this passes through the car 1 on to the switch 13 at the opposite end of the car and through that switch and another conductor to the contacts in the face of the electric coupler at that end of the car. In other words, the conductors 53 and 54 might be said to be made continuous throughout the train such that the pressure of the on or off button on any one car will operate the switches 37 to their open position on all cars, thus substantially reducing the current taken from the bus 29 to zero, or substantially so.

Other benefits than those first set forth in this specification have been brought out in the description of my invention and modifications thereof will be apparent to those skilled in the art, but I wish to be limited only by my claims.

I claim:—

1. The combination with an electrically operated car, of car, air and electric couplers, an air system and electric circuits connected to the air and electric couplers respectively, a valve to control the air current, a circuit switch to control the electric circuits to the coupler, air operated means to operate the switch and valve to open the valve when the switch is closed, a conductor switch to control the current from a conductor and electrically operated means to automatically close this switch whenever the conductor is energized and to hold the switch closed, means to open the switch when the conductor is de-energized, and manually operated means to short circuit the electrically operated means to open the last said switch at will of the operator prior to the opening of the circuit switch.

2. The combination with a car of a current collector, a main circuit leading from the collector to the car to supply current thereto, an auxiliary circuit, a control switch to control the current from the main circuit to the auxiliary circuit, electrically operated means energized to automatically close the control switch when the main circuit is charged and hold the switch closed, means biased to open the switch when the operating means is de-energized and manually operated means to de-energize the operating means to open the switch temporarily at will.

3. The combination with a car of a current collector, a main circuit leading from the collector to the car to supply current thereto, a control switch to control the current from the main circuit to car circuits, electrically operated means energized to automatically close the control switch when the main circuit is charged and hold the switch closed, means biased to open the switch when the operating means is de-energized and manually operated means to short circuit the operating means to control the de-energization of the operating means to open the switch temporarily at will.

4. The combination with a car of a main bus-line circuit for supplying current to the car, a control switch to control the current from the main circuit to car circuits, electrically operated means energized to automatically close the control switch when the main circuit is charged and hold the switch closed, means biased to open the switch when the operating means is de-energized and manually operated means to control the de-energization of the operating means to open the switch temporarily at will.

5. The combination with a car of a bus-line circuit supplying current to various car circuits, a control switch to control the current to the various circuits, means biased to automatically close and hold the switch closed when the bus-line is charged, means mechanically operable at will to render the said holding means inoperable and means biased to open the switch when the holding means is inoperable.

6. The combination with a car of a bus-line circuit supplying current to various car circuits, a control switch to control the current to the various circuits, means operated by current taken from the bus-line biased to automatically close and hold the switch closed when the bus-line is energized, means manually operable at will to render the said holding means inoperable and means biased to open the switch when the holding means is inoperable.

7. The combination with a car of a bus-line circuit supplying current to an auxiliary circuit, a control switch to control the current to the auxiliary circuit, operating means biased to automatically close and hold the switch closed when and while the bus-line is energized, an electric coupler to which the bus-line is connected, a switch controlling the bus-line connection to the coupler, operating means to open or close the bus-line switch and manually operated means to control the operating means of the bus-line switch and short circuit the operating means of the control switch.

8. The combination with a car of a bus-line circuit supplying current to an auxiliary circuit, a control switch to control the current to the auxiliary circuit, operating means biased to automatically close and hold the switch closed when and while the bus-line is energized, an electric coupler to which the bus-line is connected, a switch controlling the bus-line connection to the coupler, operating means to open or close the bus-line switch and manually operated means to control the operating means of the control switch and the bus-line switch to open the control switch prior to the opening of the bus-line switch.

9. The combination with a car of a bus-line circuit supplying current to an auxiliary circuit, a control switch to control the current to the auxiliary circuit, operating means biased to automatically close and hold the switch closed when and while the bus-line is energized, an electric coupler to which the bus-line is connected, a switch controlling the bus-line connection to the coupler, operating means to open or close the bus-line switch and manually operated means to control the operating means of the control switch and the bus-line switch to open the control switch instantly upon closing the bus-line switch.

10. The combination with a car of a bus-line circuit supplying current to an auxiliary circuit, a control switch between the bus-line and the auxiliary circuit, operating means biased to automatically close the switch when the bus-line is energized, means to open the switch when the bus-line is de-energized, a plurality of train line circuits, an electric coupler to which the train line circuits are connected, a switch controlling the train line circuits to the coupler, pneumatically operated means to alternately open and close the switch and means to control at will the operation of the operating means for the control switch and for the train line switch to open the control switch prior to opening the train line switch.

11. The combination with two coupled cars of means to mechanically hold the cars coupled, electric circuits in each car, means on each car to connect the circuits, an air system on each car, a bus-line circuit on each car, an auxiliary circuit on each car receiving current from its bus-line, a control switch for each auxiliary circuit, operating means for each switch to close the switch when and while the bus-line is energized, a control circuit connecting the switches on the two cars and controlled by a train line switch on each car, pneumatically operated means to alternately open and close each train line switch, means on one of the cars to control, at will of an operator, the operating means for the control switches and for the train line switches to open the control switches and the train line switches on both cars, the control switches opening first.

12. The combination with two coupled cars, of means to mechanically couple the cars, electric circuits in each car, means on each car to connect the circuits, a conductor on each car energized from a source of current supply, an auxiliary circuit on each car receiving current from its conductor, a control switch for each auxiliary circuit, operating means for each switch to automatically close the switch when the conductor is energized, a control circuit connecting the switches on the two cars and controlled by a train line switch on each car, operating means to alternately open and close each train line switch and manually operated means on each car to control the operation of the switches on both cars from a station in one car to open the auxiliary circuit switches prior to opening the train line switches.

13. The combination with a car of a main circuit deriving current from a grounded source of electric power, a plurality of circuits deriving current from the source of power, a switch to control the current to the circuits electrically, controlled means to close the switch when and while the main circuit is energized comprising an electro-magnet, the coil of which is connected between the source of power and the ground, means biased to open the switch when the electro-magnet is not energized and means manually operable at will to connect the ground side of the electro-magnet to the source of power to de-energize the electro-magnet and permit the switch to open.

14. The combination with a car of a conductor energized from a source of current supply, an auxiliary circuit receiving current from the conductor and controlled by a switch which automatically opens when the conductor is de-energized and automatically closes when the conductor is energized, means to close the switch and means to open the switch, an electric coupler, a second conductor connected to the coupler, and a switch to control the same and means to operate the switch alternately to its open and closed position, an airbrake line and valve to control same and connected to the last said switch to operate in unison therewith and to open when the switch closes and vice-versa, and means manually operable at will to control the operating means for the two switches.

15. The combination with a car, of a car and an electric coupler, electric circuits, a bus-line connected to the electric coupler, an automatically opening switch controlling the electric circuits, a second switch in the bus-line, electro-magnetic operating means to close the first switch, pneumatic actuating means for the second switch, an electro-pneumatic valve to control the pneumatic operating means, and means to de-energize the electro-magnetic means and energize the electro-pneumatic means to open the switches, the first switch opening prior to the second switch from their closed positions.

16. The combination with a car, of a car coupler and an electric coupler, a bus-line and an auxiliary circuit, means connecting the bus-line to a source of supply, means to automatically connect the auxiliary circuit to the bus-line when the bus-line is energized and other means under manual control to connect and disconnect the bus-line to and from the electric coupler at will and to disconnect the auxiliary circuit from the bus-line during the connecting and disconnecting of the bus-line relative to the coupler.

17. The combination with a car, of a car coupler and an electric coupler, a bus-line and auxiliary circuits, means connecting the bus-line to a source of supply, means to automatically connect the auxiliary circuits to the bus-line when the bus-line is energized and other means under manual control to connect and disconnect the bus-line to and from the electric coupler at will and disconnect the auxiliary circuits from the bus-line prior to disconnecting the bus-line from the coupler, a pneumatic uncoupling mechanism for the car coupler, an air pressure supply line, means to automatically connect the uncoupling mechanism to the air supply after the said other means have disconnected the bus-line from the electric coupler.

18. The combination with a car and electric coupler, of a bus-line connected to the coupler, a switch controlling the bus connector, auxiliary circuits, a second switch controlling the auxiliary circuits relative to the bus-line and electro-magnetic means to automatically close said second switch whenever the bus is energized, a control circuit leading from the electro-magnetic means to the coupler and controlled by the first switch, means to actuate the first switch and a manually operated switch controlling a circuit leading from the bus to the control circuit to de-energize the electro-magnetic means when the manually operated switch is closed.

19. The combination with a car of a current collector, a main conductor, an auxiliary circuit, a switch controlling the auxiliary circuit relative to the main conductor, the switch comprising contactors, means biased to open the switch, electro-magnetic means deriving its current from the main conductor operating to close the switch whenever the main conductor is energized and hold the switch closed, and means to de-energize the electro-magnetic means at will to open the switch without de-energizing the main conductor.

In testimony whereof I affix my signature.

ERNST A. LARSSON.